Nov. 14, 1933.   G. A. MORGAN   1,935,055
TIRE VALVE STEM BENDING TOOL
Filed Jan. 15, 1931   2 Sheets-Sheet 1
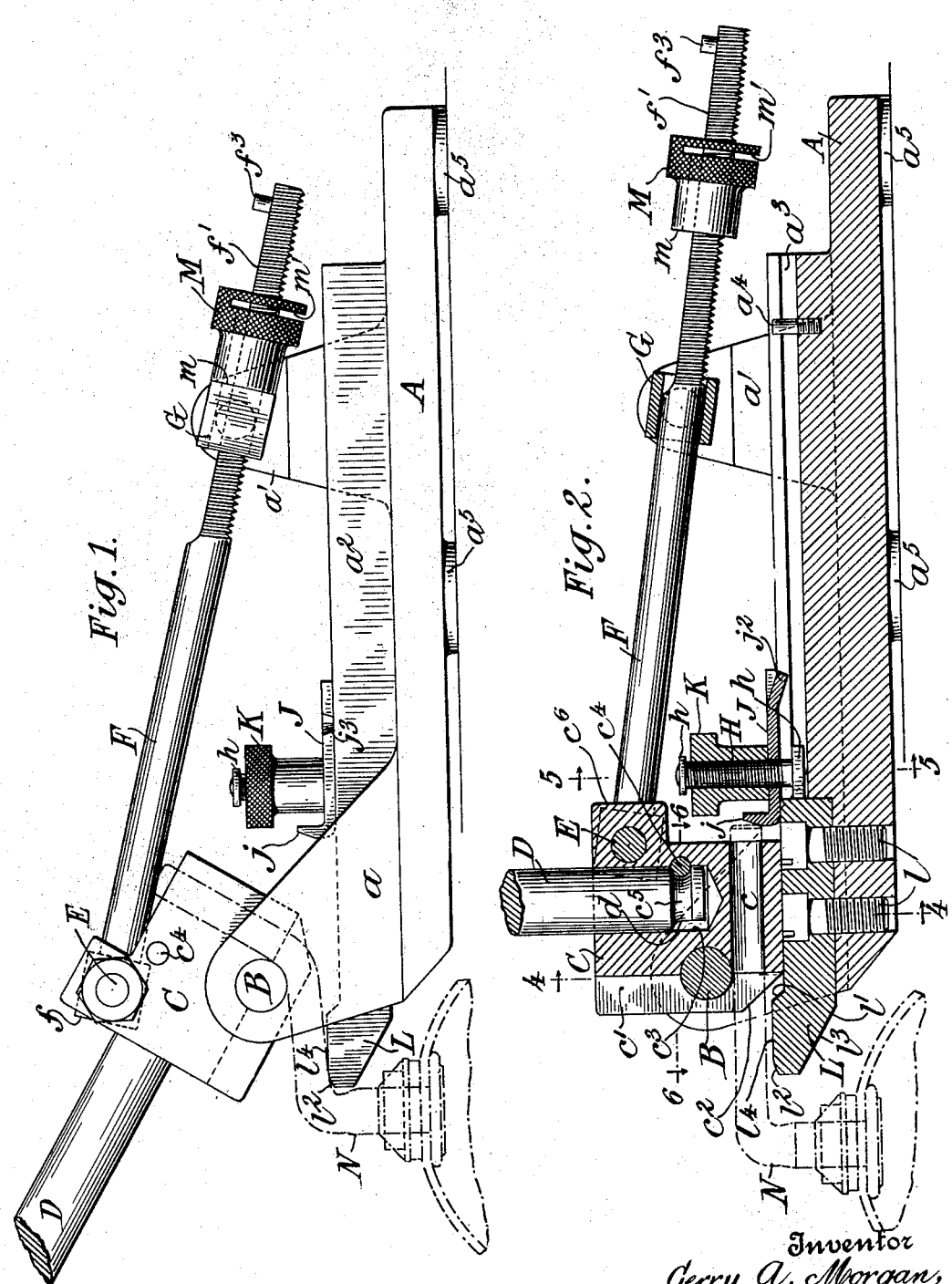
Inventor
Gerry A. Morgan
By his Attorneys
Fraser, Myers Manley Nov. 14, 1933.  G. A. MORGAN  1,935,055
TIRE VALVE STEM BENDING TOOL
Filed Jan. 15, 1931  2 Sheets-Sheet 2
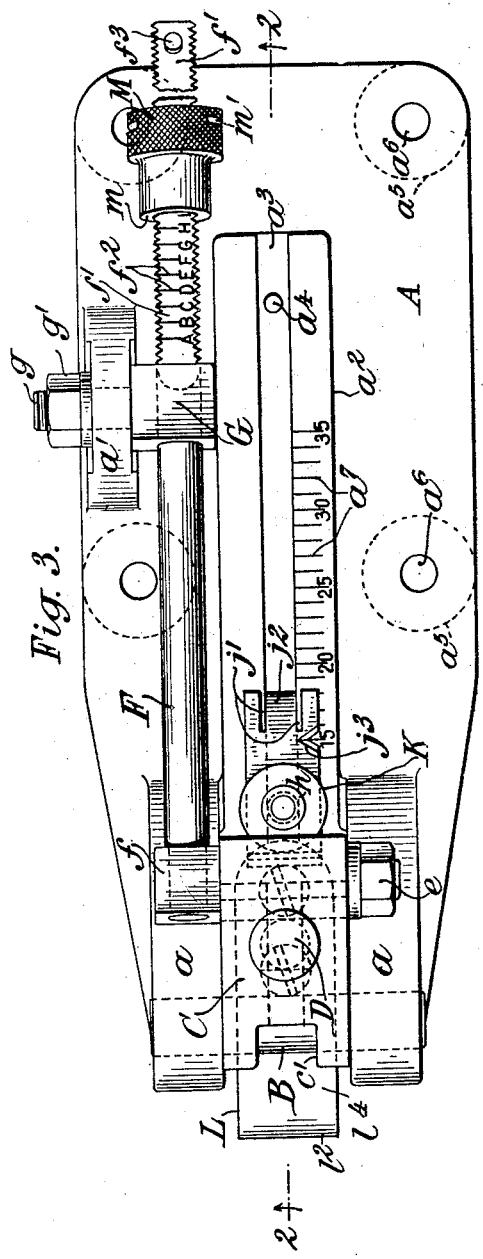
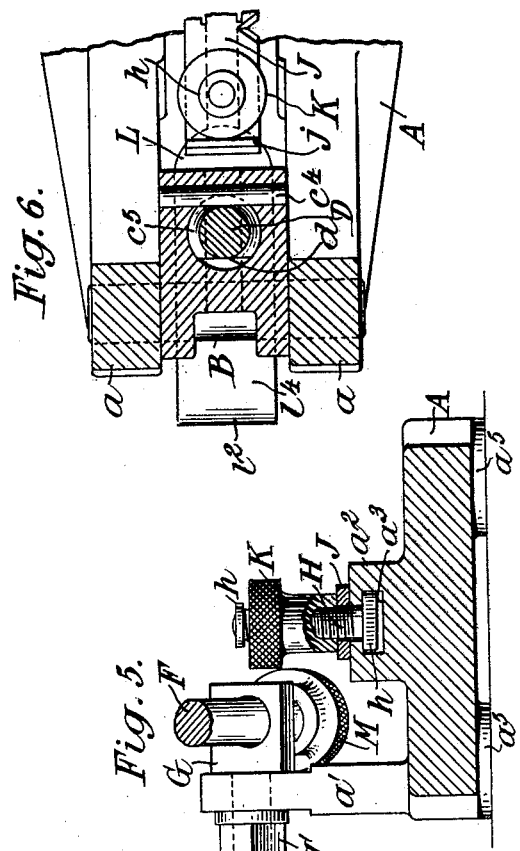
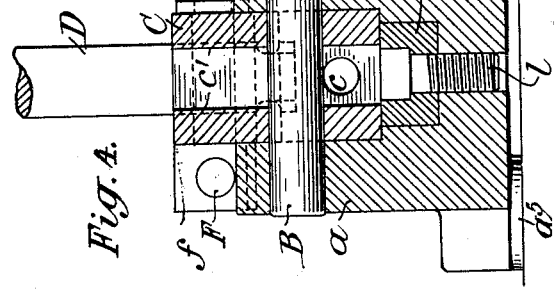
Inventor
Gerry A. Morgan
By his Attorneys,
Fraser, Myers & Mauley Patented Nov. 14, 1933

1,935,055

UNITED STATES PATENT OFFICE 1,935,055

TIRE VALVE STEM BENDING TOOL

Gerry A. Morgan, Garden City, N. Y., assignor to A. Schrader's Son, Incorporated, Brooklyn, N. Y., a corporation of New York Application January 15, 1931. Serial No. 508,874

8 Claims. (Cl. 81—15)

The present invention relates to valve stem bending tools and aims to provide certain improvements therein.

It is well known that certain vehicle wheels and certain types of tire rims require the tire mounted thereon to have a special bend or angle valve stem in order that the tire may be conveniently inflated, deflated, and gaged. It is also well known that it is impracticable for tire dealers and service stations to carry complete lines of tires with such bent stems, hence the difficulty and inconvenience frequently experienced by motorists in obtaining quick replacement of inner tubes having bent valve stems. This is particularly true with respect to inner tubes, the valve stems of which have a double bend.

To overcome this inconvenience it has been proposed that the tire manufacturers equip the inner tubes intended for use on passenger cars with a straight valve stem, which, if need be, may be bent to any desired angle; and that they equip the tubes intended for motor trucks with a valve stem which already has a single bend, and to which valve stems a second bend may be imparted, depending on the character of the wheel upon which the tire is to be mounted, and that the dealers and service stations be supplied with tools for bending these stems to the desired shapes.

According to the present invention I provide an improved valve stem bending tool with which either a single bend in a straight valve stem or a second bend in a valve stem already provided with a single bend can be readily made. Preferably the tool is designed to be mounted upon a work bench or table and has adjustable means for governing both the angle of the bend and the position on the valve stem at which said bend is to be made. The invention also contemplates other features of novelty which will be understood from the detailed description which follows.

In the accompanying drawings I have illustrated a preferred embodiment of my invention wherein, Figure 1 is a side elevation of my valve stem bending tool.

Fig. 2 is a longitudinal section partly in elevation, of said bending tool, said section being taken substantially along the plane of the line 2—2 of Fig. 3.

Fig. 3 is a top plan view of the tool shown in Figs. 1 and 2.

Figs. 4, 5, and 6 are sections taken respectively along the planes of the lines 4—4, 5—5, and 6—6 of Fig. 2.

The valve stem bending tool of the present invention comprises as its principal elements means for supporting the valve stem, a surface over which the stem can be bent, means for bending the stem over said surface, means for controlling the point on the valve stem at which the bend is to be made therein, and means for controlling the angle to be formed at the bend.

Referring to the drawings, let A indicate a base member which may be in the form of an elongated casting having at one end a pair of upstanding ears $a, a$, and an additional ear $a'$ located adjacent one of the longitudinal edges of the base midway between the ends thereof and disposed in substantially parallel relation to the ears $a, a$. Pivotally mounted between the ears $a, a$ upon a pivot or hinge pin B is a block C which is adapted to be moved about its pivotal point through the medium of a handle D. Pivotally secured to the block C through the medium of a hinge pin E is a gage bar F which is slidably supported in a trunnion G pivotally mounted on the ear $a'$. These parts will now be described more in detail and their cooperative relationship and functions will thus be made apparent.

The base member A on its upper face is formed with a longitudinally extending rib or projection $a^2$ which extends centrally of the casting and terminates short of either end thereof. Said casting is milled to provide an inverted T-shaped slot $a^3$, within which is mounted the non-circular head $h$ of a screw H. Loosely fitted over said screw so as to abut against the top surface of the rib $a^2$ is a stop plate J, one end of which is bent upwardly, as indicated at $j$, to provide an abutment, and the other end of which is provided with a pair of slots or incuts $j'$ to provide therebetween a tongue $j^2$ which is bent downwardly out of the normal plane of the plate J into the slot $a^3$. The tongue $j^2$ thus serves to guide the stop plate J in its movement along the rib $a^2$. To prevent the accidental withdrawal of the screw H and stop plate J from the slot in the rib, a screw pin $a^4$ is mounted in the rib near the rear end thereof and extends into the slot $a^3$. The top face of the rib $a^2$ is machined off and provided with indicia $a^7$ and constitutes a gage plate for the stop plate J, which is provided with a cooperating index in the form of a V incut in its lateral face designated $j^3$. To hold the stop plate J in any set position along the gage plate, there is mounted on the screw H a nurled clamp nut K adapted to clamp said H a knurled clamp nut K adapted to clamp said stop plate at any desired point indicated by the index $j^3$. To prevent the removal and possible loss of the clamp nut K from the screw H, the end of said screw is peened over, as indicated at $h$, after the nut K is mounted thereon. For mounting the base upon a bench or table, it is formed on its under side with short cylindrical lugs $a^5$ which are centrally drilled to provide bolt-receiving openings $a^6$.

Mounted at the forward end of the base on the upper face thereof between the ears $a$, $a$, and projecting beyond said end, is a supporting plate L. The plate L is held in fixed relation upon the base A through the medium of the screws $l$ and has the major portion of its top face lying in the same plane as the top of the rib $a^2$. The end of said plate which projects beyond the base has its top face slightly raised above the remaining top surface for a purpose which will presently be made apparent. To provide clearance for the working parts and for the work operated upon, the edges at the projecting end of the plate L are chamfered, as indicated by the reference characters $l'$, $l^2$ and $l^3$.

The block C, as heretofore stated, is pivotally mounted on the hinge pin B, the ends of which are set in the ears $a$, $a$. The block C normally rests upon the top surface of the plate L and has extending therethrough in tangential relation to the hinge pin B, a socket $c$ which is adapted to receive the end portion of a valve stem to be bent. The diameter of the socket $c$ is such as to snugly accommodate such valve stem portion, which is of standard diameter. Extending perpendicularly of the socket $c$ in the block C is a groove $c'$ which is intended to provide a clearance for the valve stem as it is being bent around the hinge pin. To provide a further clearance and permit the pivotal action of the block C above the plate L, the lower corner of the block beneath the pivotal connection is chamfered, as indicated at $c^2$. To accommodate the handle D, the top of the block is provided with a cylindrical socket $c^3$, near the bottom of which it is provided with a tangentially-extending pin $c^4$. This pin is adapted to cooperate with an annular groove $c^5$ near the end of the handle D to hold said handle within the socket $c^3$. To permit cooperative engagement between the end of said handle and the pin $c^4$, the handle at said end is cut away, as indicated at $d$ in Figs. 2 and 6. To provide a supporting bearing for the pivot pin E the top of the block C is formed with an offset projection or lug $c^6$ having an opening therethrough in which the pin E loosely fits.

The gage bar F, as aforestated, is pivotally mounted with respect to the block C, and to provide for this pivotal mounting the gage bar F has affixed to one end thereof a trunnion $f$, which, in turn, is mounted on the pivot pin E. To hold said pivot pin with its trunnion in mounted relation upon the block C, the end of the pin E is screw-threaded and fitted with a nut $e$. The gage bar F for a substantial distance inwardly from its end opposite to that which is provided with the trunnion $f$, is screw-threaded and partially cut away to provide a flat surface $f'$ having indicia $f^2$ thereon. A nurled thumb-nut M is screw-threadedly mounted on the gage bar, and the bottom edge $m$ of the nut is adapted to serve as an index in cooperation with the indicia $f^2$ for setting the gage bar and limiting its movement as the block C is moved. To act as a sort of spring washer to hold the nut in any set position of the gage bar, the nut is provided with a deep incut slot $m'$ near one end thereof. The trunnion G, which is pivotally mounted on the gear $a'$, through the medium of a screw stud $g$ and nut $g'$, serves as an abutment for the nut M at the limit of movement of the gage bar for a given setting. To prevent accidental unscrewing of the nut M from the gage bar, the latter is provided with a stud $f^3$ near its screw-threaded end.

In use the parts of the valve bending tool are normally disposed, as shown in Figs. 2 and 3. Now if it is proposed to form a bend in a tire valve stem, such as, for example, N, shown in dotted lines in Figs. 1 and 2, at a given distance from the valve-receiving end thereof, the stop plate J is set at the desired point on the gage plate by operating the clamping nut K. The nut M on the gage bar F is then set so that the stem will be bent to the desired angle. With the gages set for both the point at which the bend is to be made and the angle to which the valve stem is to be bent, the valve stem N is inserted into the socket $c$ until its outer end abuts against the lip $j$ on the stop plate J. The block C is then moved through the medium of the handle D about its pivot B, in the course of which that portion of the valve stem N within the socket $c$ is bent around the convex surface of the pivot pin B, as best shown in Fig. 1. In the course of the movement of the block C about its pivot the gage bar F is also moved therewith, and such movement is continued until the stop nut M contacts the trunnion G. The parts are then returned to normal position and the bent valve stem withdrawn. In the illustrated example of the use of the device, a valve stem already having an angular bend therein has been acted upon to impart a second bend therein. It will be apparent, however, that straight valve stems can similarly be bent. Valve stems for use on passengers cars frequently require a single bend at a given angle, and although these angles may vary for different types of wheels, the bend is usually always made at the same point on the valve stem, namely, at the juncture of the threaded foot portion with the unthreaded stem portion. In order that the present tool may be equally adaptable for use with such stems, the top surface $l^4$ of the projecting end of the plate L, it will be noted, is slightly below the bottom of the socket $c$ and is thereby adapted to have the flat on the threaded portion of the stem rest thereon when the shoulder connecting the threaded portion with the unthreaded portion abuts against the convex surface of the hinge pin B. It will thus be seen that with the present device a straight or initially bent valve stem can be bent at any predetermined point to any predetermined angle.

The foregoing device, it will be appreciated, is simple, compact, easily operable, and through the medium of the handle D, which may be of any desired length, the force necessary to impart a bend in the valve stem may be easily applied.

While I have shown and described a preferred embodiment of my invention, I do not wish to be limited to the details of construction disclosed, since it will be apparent to one skilled in the art that the same may be varied without departing from the spirit of the invention.

What I claim is:
1. A bending tool for tire valve stems or the like, comprising a pair of pivotally connected members, one of said members having means for supporting the valve stem at the valve-receiving end thereof and a surface over which the stem can be bent, means for bending the stem over said surface, adjustable means on the other of said members adapted to engage said valve-receiving end of the valve stem for controlling the point thereon at which the bend is to be made therein, and adjustable means movable by the first of said members for controlling the angle to be formed at the bend.

2. A bending tool for tire valve stems or the like, comprising a member having a socket for receiving the valve holding end of a valve stem, a surface over which the stem can be bent, means for bending the stem over said surface, and an abutment against which a part of the valve stem can engage to determine the point on the valve stem at which the bend is to be made therein.

3. A bending tool for tire valve stems or the like, comprising a pair of pivotally connected members, one of said members having a socket for receiving the valve holding end of a valve stem, a surface over which the stem can be bent, means for bending the stem over said surface, adjustable means on the other of said members adapted to engage the valve-receiving end of the stem for controlling the point thereon at which the bend is to be made therein, and adjustable means movable by the first of said members for controlling the angle to be formed at the bend.

4. A bending tool for tire valve stems or the like, comprising a pair of pivotally connected members, a socket in one of the members for supporting the valve stem, a convex surface disposed at a right angle to said socket over which the valve stem can be bent, said surface being substantially concentric with the pivotal axis of the members, and means for bending the valve stem over said convex surface as the pivotally connected members are moved relatively to each other.

5. A bending tool for tire valve stems or the like, comprising a pair of pivotally connected members, a hinge pin providing said pivotal connection, a socket in one of the members for supporting the valve stem, said socket being disposed at a right angle to the hinge pin, a convex surface on the hinge pin over which the valve stem can be bent, and means for moving said socket-containing member about said hinge pin for bending the valve stem over said convex surface.

6. A bending tool for tire valve stems or the like, comprising a base member having a pair of spaced ears, a member pivotally mounted between said ears, one of said members being adapted to support a valve stem, a convex surface on one of said members over which the valve stem can be bent, adjustable means on one of said members for controlling the point on the valve stem at which the bend is to be made therein, and means for engaging the stem and bending it as the pivoted member is moved about its pivot.

7. A bending tool for tire valve stems or the like, comprising a base member having a pair of spaced ears, a block member pivotally mounted between said ears, a socket in said block member for receiving the end of the valve stem, an adjustable stop element on said base member against which the end of the valve stem can engage, a convex surface on one of the members over which the valve stem can be bent, and means for bending the valve stem as the block member is moved about its pivot.

8. A bending tool for tire valve stems and the like, comprising a base member having a pair of spaced ears, a member pivotally mounted between said ears, cooperating means on said members for receiving and for bending a valve stem, a gage bar pivotally carried by the second of said members and slidingly supported by the other member, and adjustable means on said gage bar adapted to engage an abutment on the base member for limiting the sliding movement of the gage bar for governing the angle to which the stem is to be bent.

GERRY A. MORGAN.